United States Patent

Barrett

[15] 3,701,263
[45] Oct. 31, 1972

[54] DIRECT CONTACT FOOD FREEZING
[72] Inventor: Arthur Lee Barrett, 2928 Lothair Way, Michigan City, Ind. 46360
[22] Filed: May 18, 1970
[21] Appl. No.: 38,558

Related U.S. Application Data
[63] Continuation-in-part of Ser. No. 743,356, July 9, 1968, abandoned.

[52] U.S. Cl. ..........................62/63, 62/382, 198/85
[51] Int. Cl. ...............................................F26d 25/04
[58] Field of Search............62/382, 378, 63, 64, 374; 198/85

[56] References Cited

UNITED STATES PATENTS

| | | | |
|---|---|---|---|
| 1,933,257 | 10/1933 | Goosmann | 62/63 |
| 3,258,935 | 7/1966 | Ross | 62/64 X |
| 1,689,099 | 10/1928 | Applegate, Jr. | 198/85 |
| 1,805,029 | 5/1931 | Baker | 198/85 |
| 3,078,979 | 2/1963 | Block et al. | 198/85 X |
| 3,114,248 | 12/1963 | Morrison | 62/380 X |
| 3,345,828 | 10/1967 | Klee et al. | 62/380 A |
| 3,368,363 | 2/1968 | Alaburda et al. | 62/64 |
| 3,434,301 | 3/1969 | Hice | 62/374 |
| 3,479,833 | 11/1969 | Waldin | 62/63 |
| 3,485,055 | 12/1969 | Webster et al. | 62/63 |

Primary Examiner—William E. Wayner
Attorney—Howard E. Sandler

[57] ABSTRACT

A direct contact food freezing method and apparatus which incorporate food carrying trays circulating through freezer chamber while food carried thereby is being sprayed with liquid refrigerant for freezing the food.

24 Claims, 31 Drawing Figures

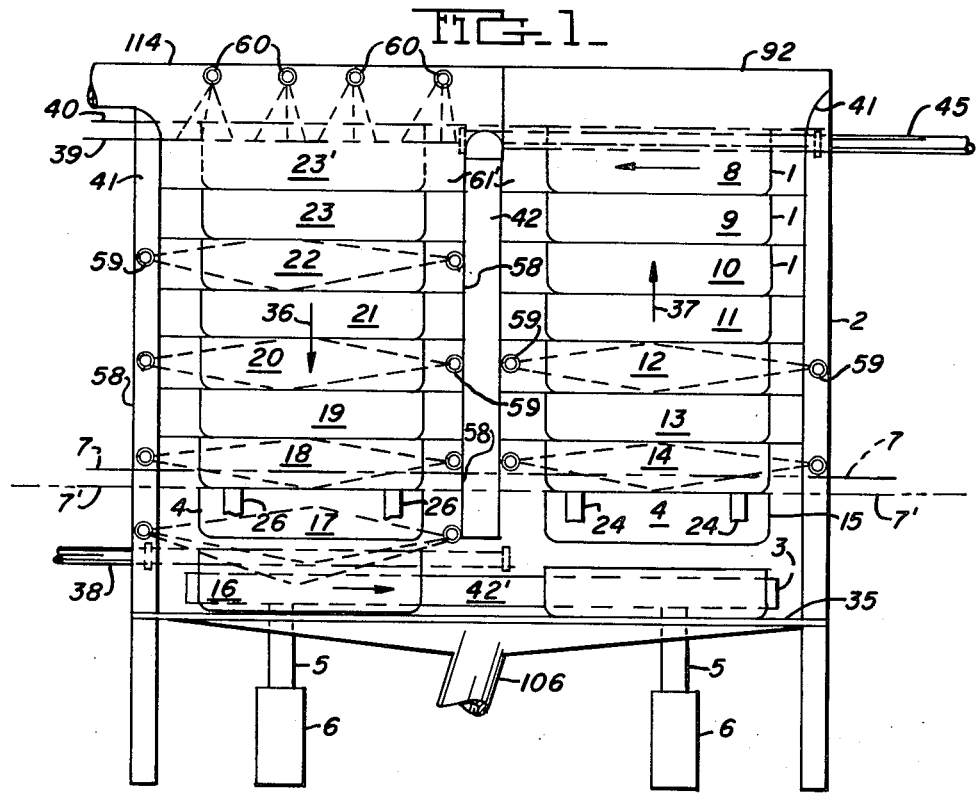
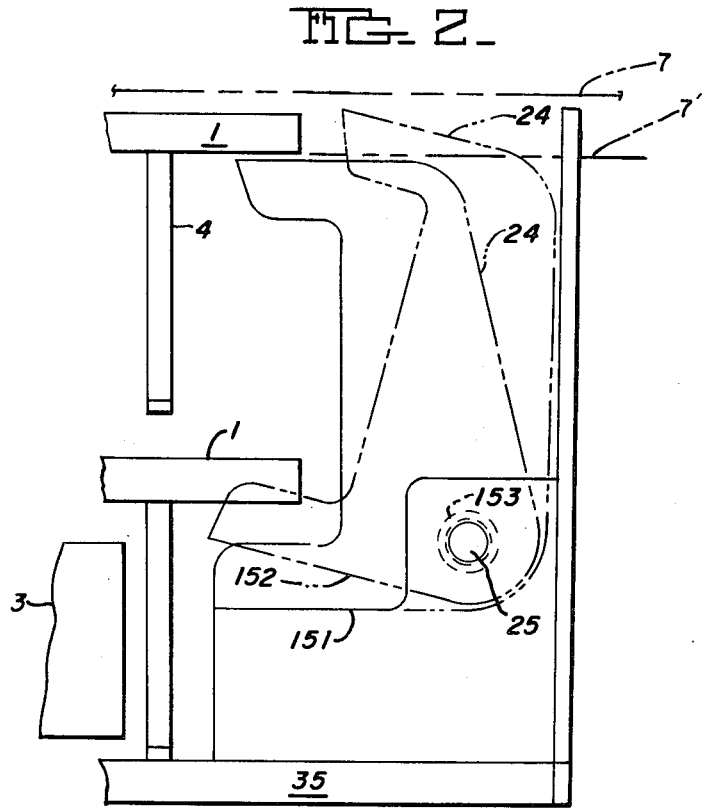

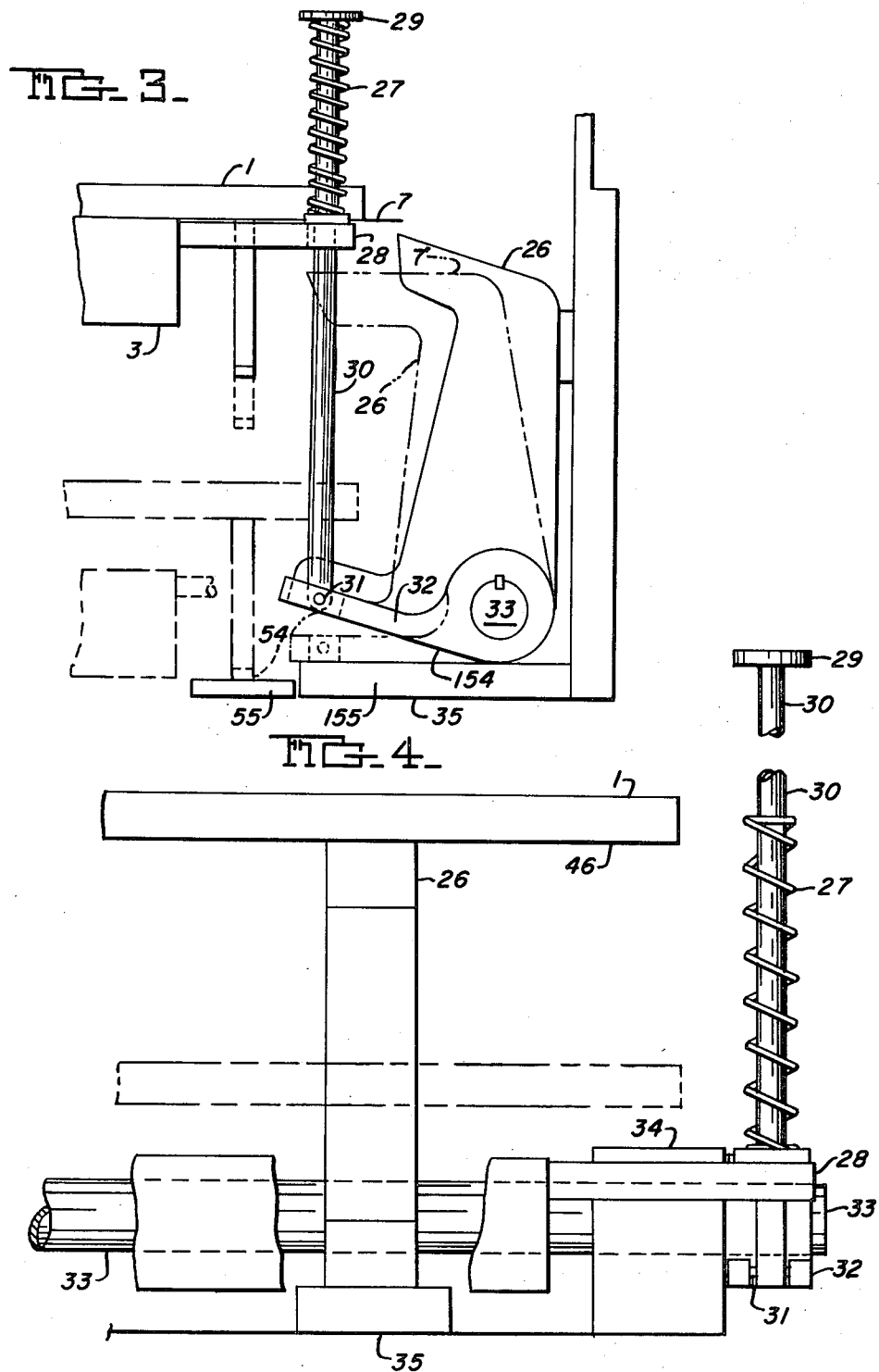

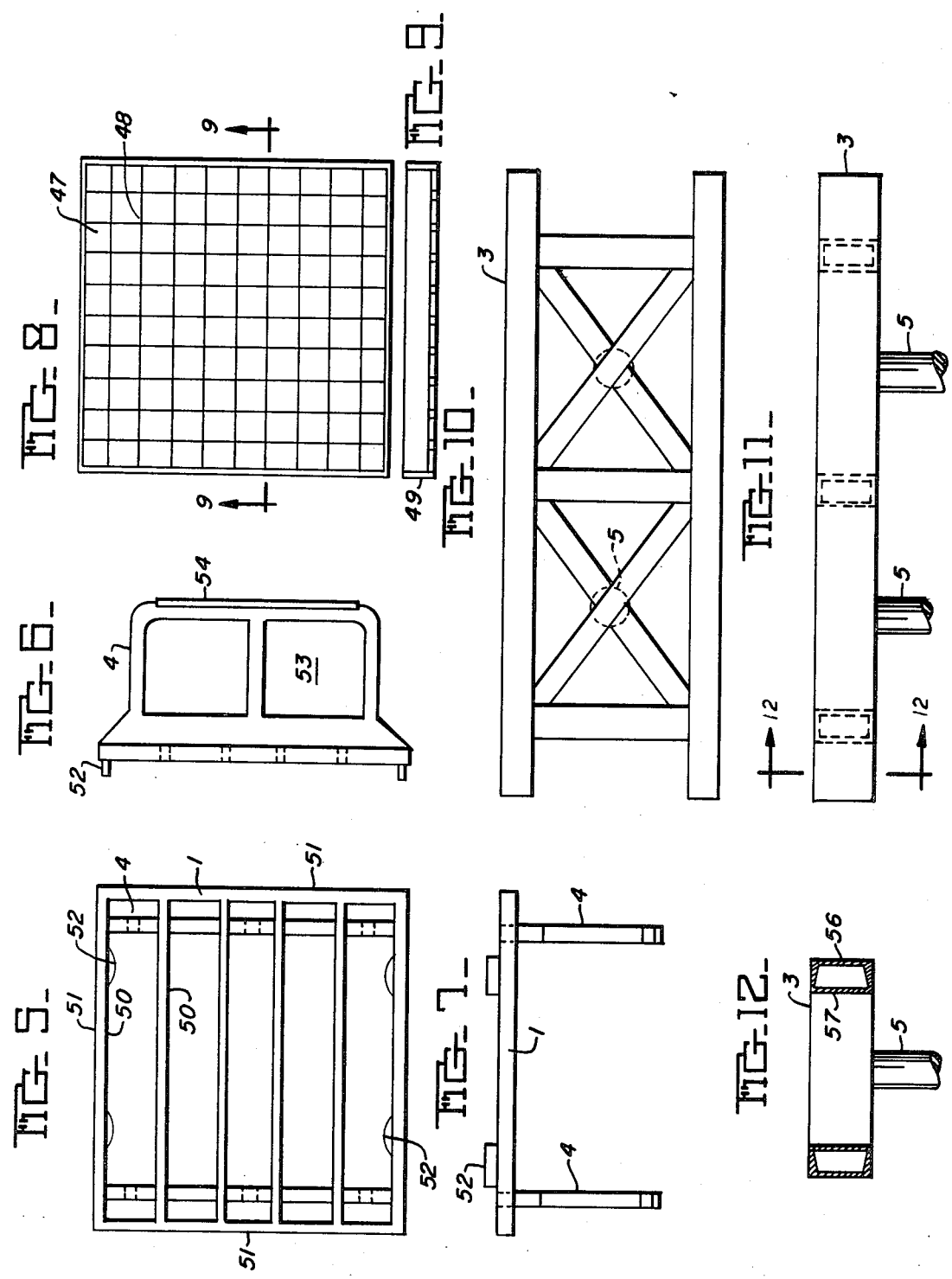

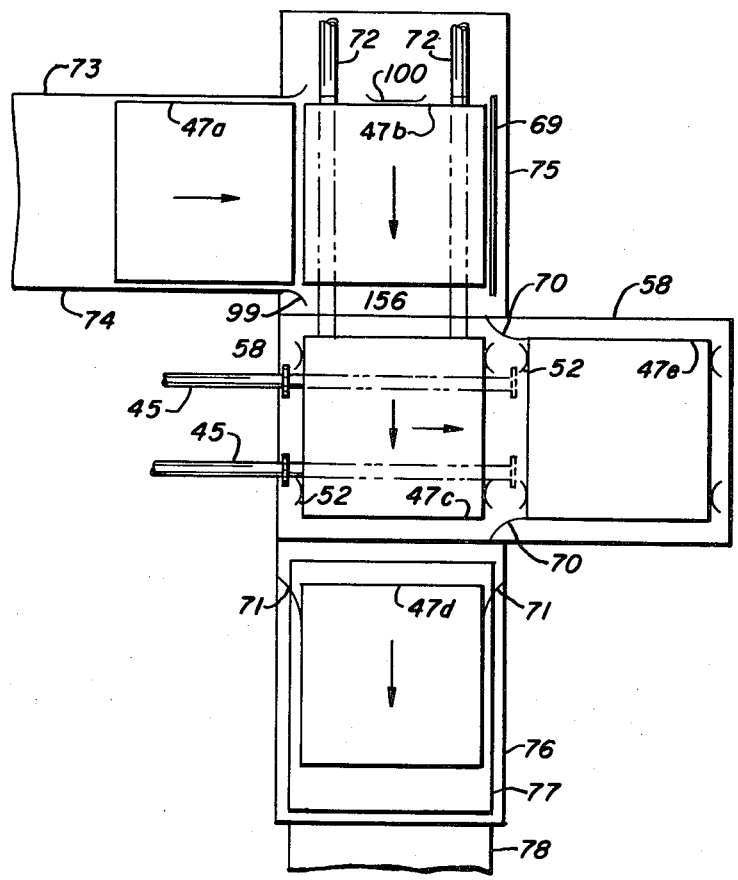
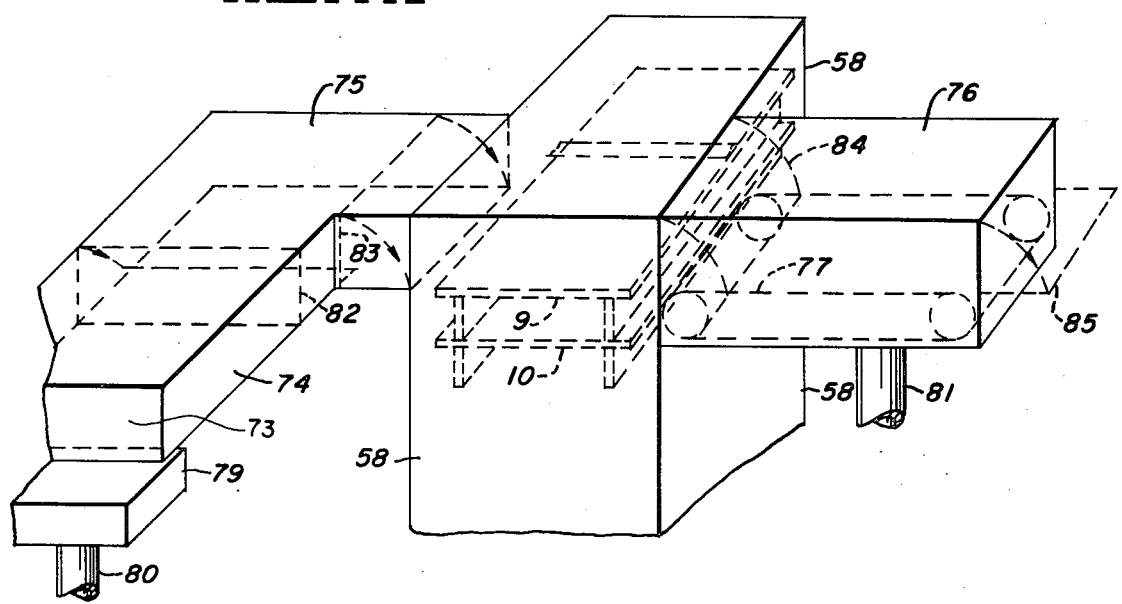

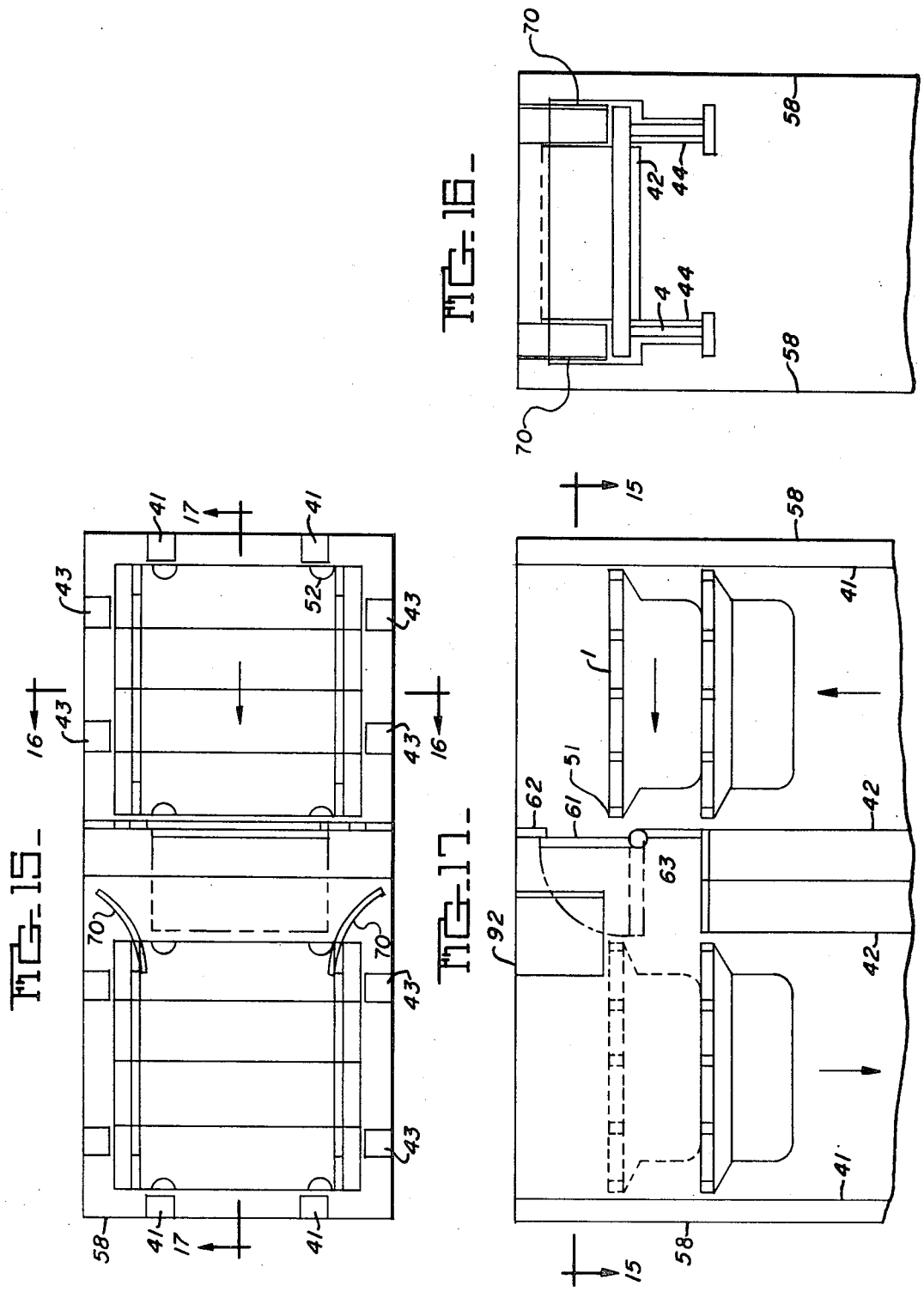

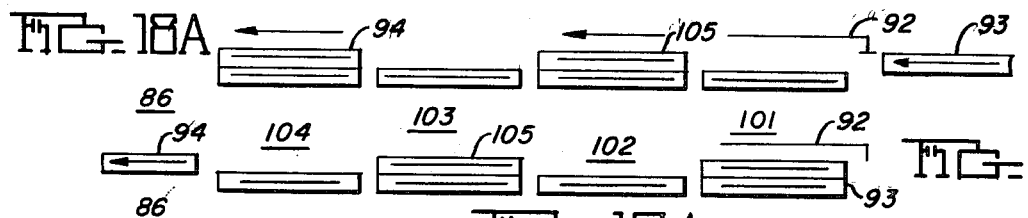
FIG. 18A
FIG. 18B.
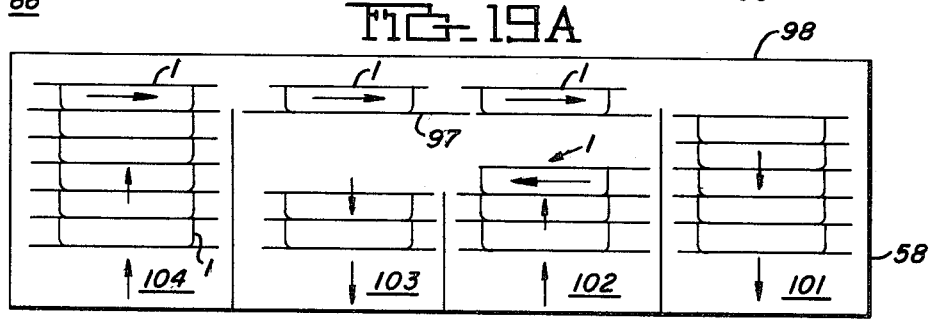
FIG. 19A
FIG. 19C.
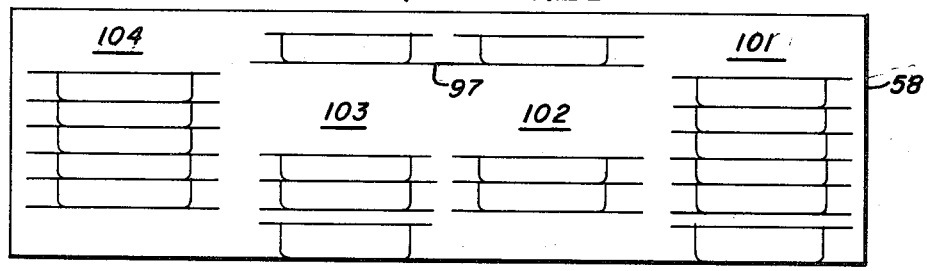
FIG. 19B.
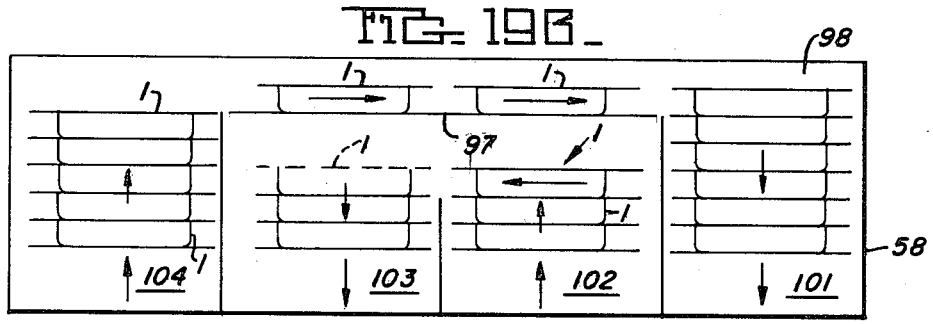
FIG. 19D.
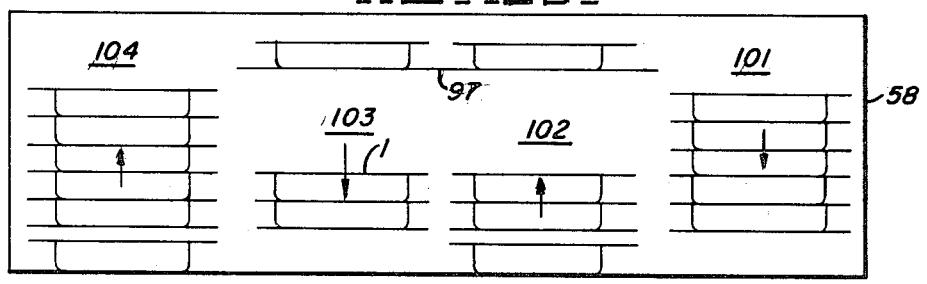

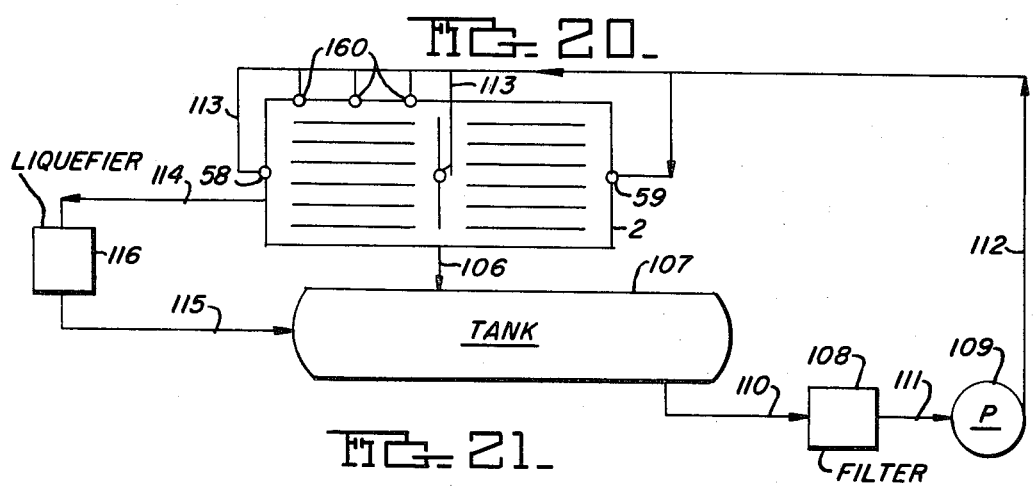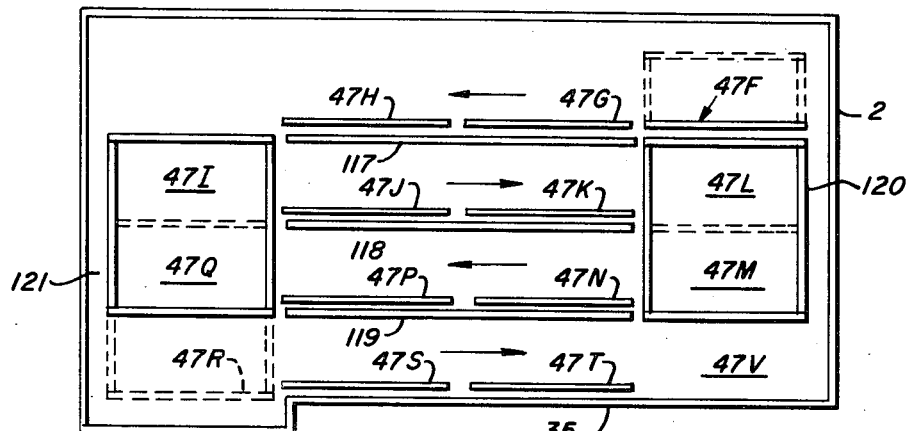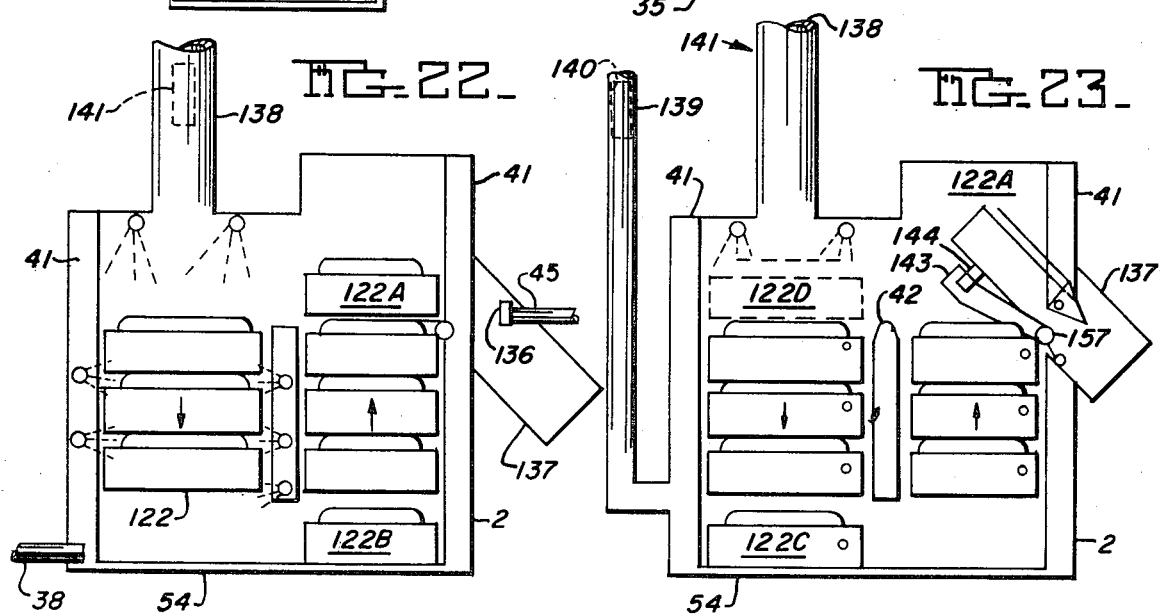

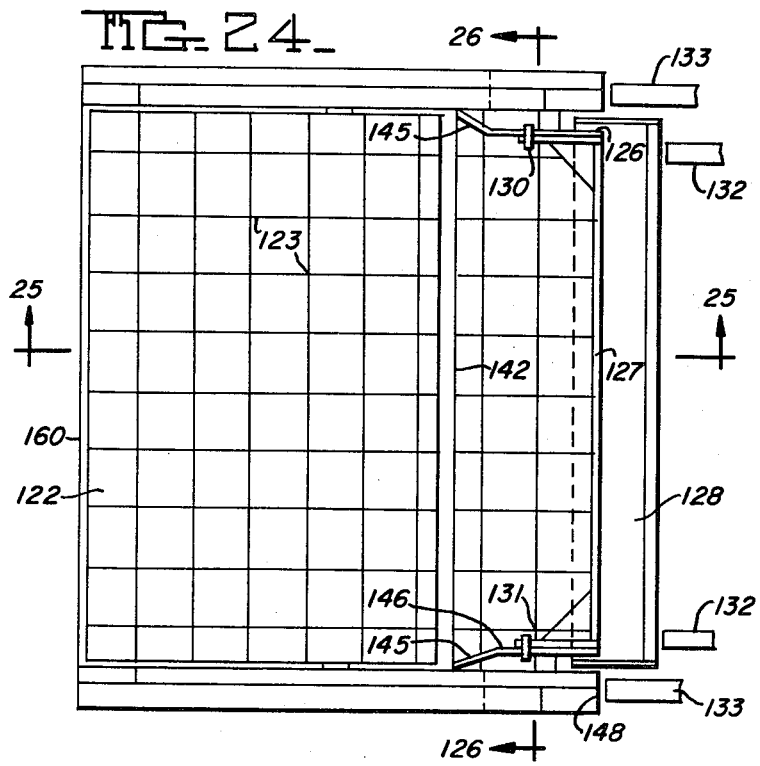
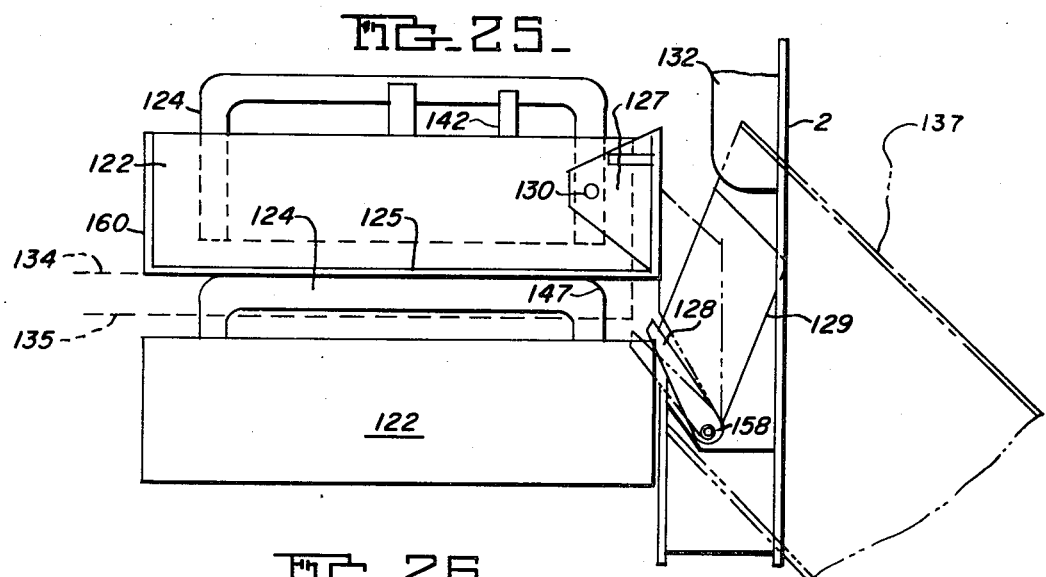
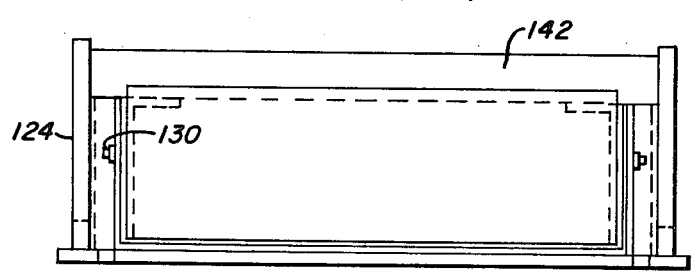

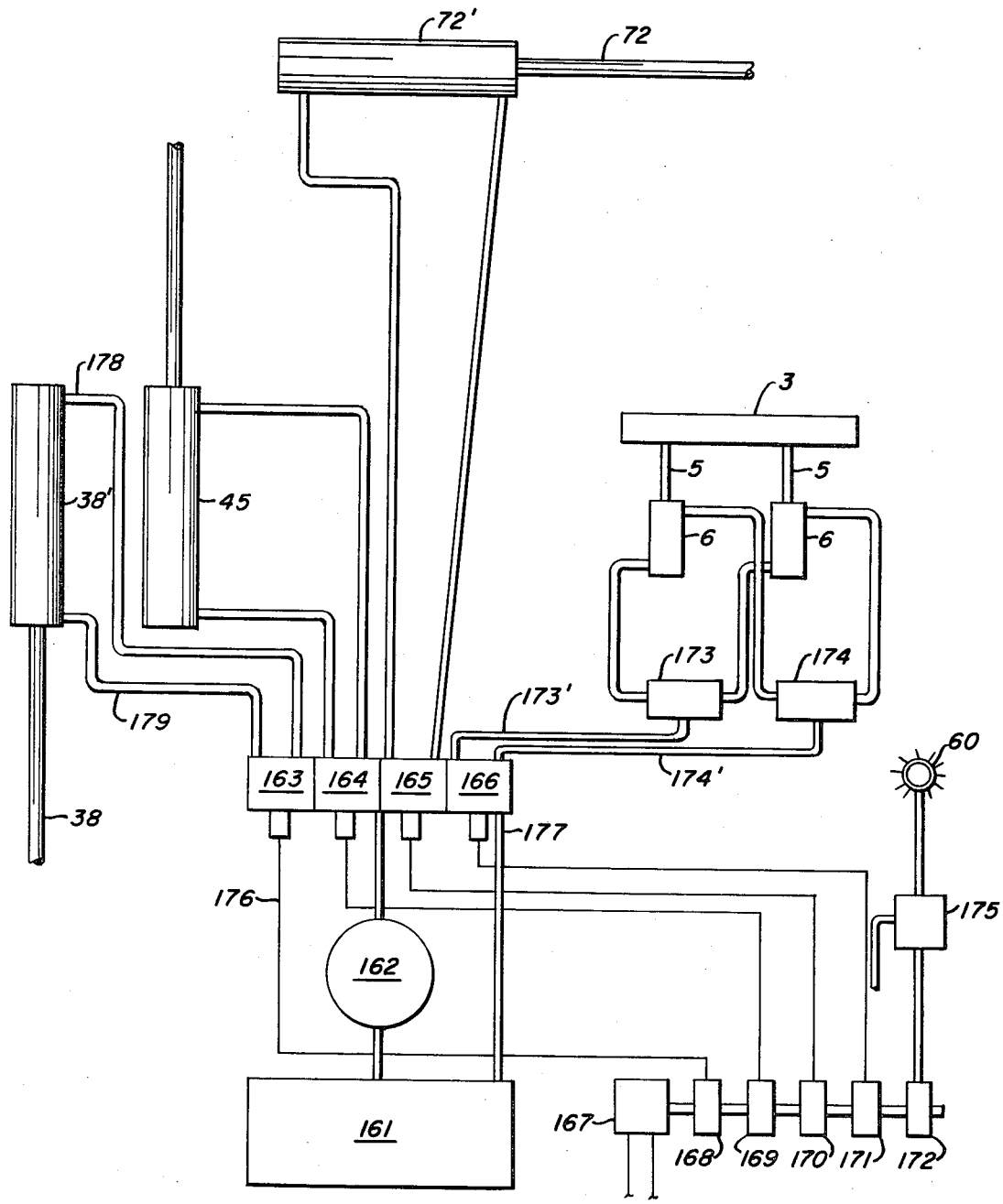

DIRECT CONTACT FOOD FREEZING

This application is a continuation-in-part of application Ser. No. 743,356 filed July 9, 1968 now abandoned.

This invention provides a means of freezing relatively large portions of food in direct contact with a boiling refrigerant.

This direct contact freezer provides for freezing of food portions such as whole potatoes, baked goods, prepared meals, prepared specialties, and meat portions in direct contact with a sprayed refrigerant such as $CCL_2F_2$ (R–12). Food portion freezing time has a direct relationship to the minimum dimension of the portion. An approximation of the time required is expressed by the formula freeze time in minutes equals 15 times the smallest dimension in inches squared in the case of vegetables, meats and such; whereas, in the case of baked goods and other such porous materials, the formula is approximately freeze time in minutes equals 25 times a minimum cross-sectional dimension; thus, whereas food particles such as lima beans having a minimal dimension of one-quarter inch freeze in less than 1 minute a potato having a dimension of 1 inch would require 15 minutes; thus for portions of 1 inch minimum dimension and greater, a freezing time of 15 minutes and more is usually necessary. Certain foods such as the leafy vegetables, spinach, turnip greens, etc. are not conveniently frozen in a normal high speed tunnel arrangement and are most advantageously frozen on trays or other open containers. For materials of these types the described direct contact freezer provides many advantages.

It is to be understood, however, that the principles of direct contact food freezing are applicable to freezing foods in packages, provided the packages are permeable by the liquid refrigerant Food pieces or permeable packages of such food are introduced into this freezer on a tray, which travels vertically downward and upwards through the freezer, being subjected to a spray of finely divided R-12 particles while traveling through the freezer. Trays are carried on carriers which are moved by means of vertical lifting mechanisms and latching supports down to a free position where they may be slid across the bottom of the freezer, the carriers subsequently being returned to the top of the freezer for discharge of the tray of frozen food, receipt of a tray of unfrozen food, and returned to the downward cycle again by a free sliding process, the carrier being subjected while sliding only to its weight, the weight of the tray, and the weight of the food thereon. Sealed entry systems are provided for the entering and discharging trays such that there will be a minimum loss of refrigerant. Trays and tray carriers are designed such that liquid or gas refrigerant from a top level may pass through the tray and carrier to the food on the tray or trays below it in the freezer, thus providing a ready path for vertical travel of the refrigerant through the freezer. Exhaust means and hood collecting means are provided to retain or catch refrigerant at the points of entry and departure of the food trays from the system. Since refrigerants such as R-12 are excellent solvents of oils and greases, arrangements are provided whereby the number of rotating or sliding bearings is minimized and whereby the loads on necessary bearings are minimized by arranging for main load supporting elements to bear on non-moving support portions. In order to eliminate interlocking seals, lifting mechanism, retaining dogs, etc., all elements have been made synchronous with respect to the motion of a portion requiring an element motion.

In order to insure that the liquid refrigerant is evaporated from the discharge food and trays, a zone is provided in the cycle sufficiently remote timewise from the discharge of the tray and food allowing residual heat to completely evaporate retained refrigerant.

Guiding is provided through the freezer for trays and tray carriers so that motion as desired for these elements will be unrestricted, but there will be no opportunity for them to get out of position, thereby causing interruption in travel through the freezer. The carriers, trays and food travel through the freezer at a constant rate for a given product, but the rate may be adjusted as desired for a change in food freezing characteristics.

These and other features and advantages of the apparatus and method of this invention will become more readily apparent upon consideration of the following description and drawings in which:

FIG. 1 is a schematic view of a two column, direct contact tray freezer constructed according to the principles of this invention;

FIG. 2 is a side view of the carrier retaining mechanism for the upward channel of the freezer of FIG. 1;

FIG. 3 is a side view of the carrier retaining mechanism for the downward channel of the freezer of FIG. 1;

FIG. 4 is an end view of the carrier mechanism for the downward freezer channel of FIG. 3;

FIG. 5 is a top view of one of the carriers shown in FIG. 1

FIG. 6 is a side view of the same carrier;

FIG. 7 is an end view of the same carrier;

FIG. 8 is a schematic top view of a food carrying tray used in such a carrier;

FIG. 9 is a schematic sectional view of the food carrying tray taken on line 9—9 of FIG. 8;

FIG. 10 is a top view of the carrier lifting mechanism of FIG. 1;

FIG. 11 is a side view of the same lifting mechanism;

FIG. 12 is a sectional view of the lifting mechanism taken on line 12—12 of FIG. 11;

FIG. 13 is a schematic, top view of the tray handling system for the device of FIG 1;

FIG. 14 is a schematic, three dimensional view of the refrigerant sealing and collection system at the point of entrance and exit of food carrying trays of the device shown in FIG. 1;

FIG. 15 is a schematic sectional view of the same freezer taken along line 15—15 of FIG. 17;

FIG. 16 is a schematic sectional view of the same freezer taken along line 16—16 of FIG. 15;

FIG. 17 is a schematic sectional view of the same freezer taken along line 17—17 of FIG. 15;

FIG. 18A is a schematic view showing tray positions at the top of a multicolumn freezer constructed according to the principles of this invention;

FIG. 18B shows similar tray positions at a later time;

FIG. 19A is a schematic, side view of a multicolumn freezer constructed according to the principles of this invention in which carriers are circulated;

FIG. 19B is a schematic view similar to FIG. 19A with carriers in new positions;

FIG. 19C is a schematic view similar to FIG. 19A with carriers in later positions;

FIG. 19D is a schematic view similar to FIG. 19A with carriers in still later positions;

FIG. 20 is a schematic view of a refrigerant circulation system for the freezer of FIG. 1;

FIG. 21 is a schematic drawing of a horizontally traversed tray freezer constructed according to the principles of this invention;

FIG. 22 is a schematic drawing of a circulating tray freezer with a barometric entrance seal constructed according to the principles of this invention;

FIG. 23 is a different schematic view of the circulating tray freezer of FIG. 22;

FIG. 24 is a schematic top view of a circulating tray and associated discharge apparatus as used in the device of FIG. 23;

FIG. 25 is a schematic view taken substantially on line 25—25 of FIG. 24;

FIG. 26 is a schematic view taken substantially on line 26—26 of FIG. 24; and

FIG. 27 is a schematic representation of timing and interlocking connections as needed for the device of FIG. 1.

Referring now to FIG. 1, a view of a circulating tray freezer in which the main body 2 of a freezer constructed according to the principles of this invention having side guide members 41 and center guide members 42, is adapted to circulate carriers 1 through the body of the food freezer as shown by arrows 36 and 37. The carriers 1 are alternately raised and lowered by lifting platform 3 which is raised and lowered by pistons 5 of hydraulic jacks 6 through a definite range, which allows a carrier 1 in position 16, for instance, to rest on the floor 35 of the freezer body 2 clear of the lifting platform 3, when the jacks are in the down position, and which will lift all bottom carriers to level 7 when the jacks are in the up position. The carriers thus travel through upside gravity dogs or retaining devices 24, shown in more detail at 24, FIG. 2, to a level 7, FIG. 1, from which they are lowered to rest on upside dogs 24 at level 7. Downside carrier in position 17 releases upside dogs 26, when the carrier has been lifted to position 7, shown in more detail at 26, FIGS. 3 and 4. When the lifting platform 3 is lowered, carrier 17 remains in contact with it since downside dogs 26 are held in the outward position by spring 27, FIG. 3 and 4, operating in cooperation with lifting platform extension 28, push rod 30, and upper push rod element 29. Carriers are traversed across the top of the freezer by an appropriate traversing mechanism such as push rod 45 (FIG. 1) actuated by an appropriate means and across the bottom of the freezer by an apparatus such as push rod 38 actuated by an appropriate means.

Refrigerant spray is introduced through top manifolds 60, downside manifolds 58 and upside manifolds 59 under pressure in order that the refrigerant may contact the food carried in the various portions of the trays 47, FIG. 8, carried in carriers 1 of FIG. 1.

Unevaporated liquid refrigerant is withdrawn from the freezer through a duct 106 for return to the circulating system and evaporated refrigerant, snow and refrigerant hydrate is withdrawn through a duct 114 for filtration, recondensation and purification for return to the circulating system.

Upside dogs 24 shown in FIG. 2 are operated preferably by gravity, but may be further urged to maintain a closed position by a spring, not shown. They rotate about loosely fitting pin 25 preferably including a non-lubricated antifriction bushing 153. When the lifting platform 3 lifts the carrier 1, its top surface comes in contact with the dogs 24 causing the dog to rotate into the broken line position shown in FIG. 2 and clear the carrier as it passes upward. When the dog 24 returns to its closed position, its contact surface 152 rests on support block 151 so that the load put on the dog by the carrier 1, when it is lowered in the contact with the dog, is not carried on the pin 25 and bushing 153, but on the contact surface dog portion 152 and support block 151.

Downside dog 26 shown in FIG. 3 has the same supporting configuration contact face 154 bearing on support block 155. Supporting platform extension 28 is adapted to engage spring 27, which in turn by pushing on upper element 29 of lift pin 30, will raise dog 26 by action through pin 31, bracket arm 32, and shaft 33 when the carrier 1 is lifted clear of the dog and will hold it open until carrier 1 has been lowered below the position of dog 26. As in the upside dog 24, downside dog 26 is adapted to be closed by gravity, but may be assisted by a spring, not shown, if desired.

Carrier 1, FIG. 5, is formed of open structure by side elements 51, cross bars 50, and support elements 4 that it may have stiffness and support ability while maintaining an open framework so that refrigerant may freely pass through it from tray to tray. Antifriction material 54, FIG. 6, or antifriction devices of any type, may be applied to the supporting sides 4 of the carrier to provide for easier traversing of the carrier across the freezer. Guide elements 52, FIG. 5, are incorporated to retain trays 47, FIG. 8, when the carrier is traversed across the freezer.

Tray 47, FIG. 8, is a perforate device with holes 48, or other equivalent perforated configuration, which will allow refrigerant to pass through the tray to subsequent trays lying below it. The tray may, or may not, be provide with a lip 49 as a means of retaining food portions on the tray depending whether the lip is necessary for food retention.

FIGS. 10, 11 and 12 are views of the lifting platform which provides cycling of the carriers through the freezer. This platform is rigidly constructed of members such as the channel shown at 56, FIG. 12, with covering 57 to provide a smooth exterior surface with no catching places for debris, thus assuring easy cleaning of the freezer. Piston rods 5, FIG. 11, are preferably rigidly attached to lifting platform 3 and should be guided in a positive manner to prevent twisting or tipping of the level platform.

In FIGS. 15, 16, and 17 is shown the relationship of end guides 41, side guides 43 and center guides 42 to the carriers. These guides keep the carriers accutately positioned and provide space between the carriers and the freezer walls 58 for the introduction of sprayed refrigerant. Gate 61 is preferably spring closed and positioned so that it is pushed to a non-interferring position by the carrier 1 as it is traversed across the top of the freezer. Center guide member 42 is extended vertically to a position near the underside of the top of carrier 1 and slots 44, shown in FIG. 16, are provided in it to effectively prevent spray transfer from the up compartment of the freezer to the down compartment of the freezer.

In schematic FIG. 13 is shown the apparatus for loading and unloading the trays from the freezer. 74, an incoming air lock portion, contains conveyor 73, which is preferably of the free-roller gravity type, but may be any desired type. Air lock portion 75 contains conveyor 156 which is adapted to transfer trays in two directions as shown. This is preferably a conveyor of the free ball type. Air lock portion 76 contains a conveyor 77, a conveyor preferably of the belt type, which delivers trays to discharge conveyor 78. Unfrozen trays of food progressively occupy positions 47a, 47b, 47c and 47e as they enter the freezer. Trays of frozen food progressively occupy positions 47c and 47d as they leave the freezer. Tray 47b is traversed into position 47c simultaneously ejecting a tray to 47d by traverse mechanism 72. Trays in position 47c are traversed to the downside of the freezer by traverse mechanism 45. Guides 99, 70 and 71 are provided in the air locks to guide the trays and carriers in their movements and guides 52 on the carriers, guide the trays onto and off of the carrier. Guide 69 in air lock 75 is disposed to locate the incoming tray from position 47a as it leaves position 47b so that it may enter the freezer from the proper position.

As shown in FIG. 14 air lock 74 contains an air lock door 82 nears its entrance; air lock 75 contains an air lock door 83 near the exit to the freezer, air lock 76 contains a door 84 near the exit of the freezer, and a door 85 near the exit of the air lock. These doors are preferably gravity of spring closed and preferably are pushed out of position by the moving tray; thus requiring no synchronous mechanism. A refrigerant vapor collecting hood 79 is disposed at the entrance to duct 74 with an outlet duct 80 through which the dense refrigerant may be collected if it leaks from air lock 74, and returned to a refrigerant purification device. Duct 81 also illustrates a collection means connected to air lock 76 from which refrigerant or mixtures of refrigerant and air may be withdrawn for purification. Air lock portion 76 may be located more remotely from the food discharge point of the freezer being connected to the freezer by a duct through which the trays are transferred to the air lock. In this duct the temperature of the food on the trays may be equalized and surface wetting refrigerant may be evaporated for retention in the freezer. If necessary, radiant heat may be applied to the food at this point to insure complete evaporation of retained refrigerant.

In FIG. 18A is shown a multichannel tray type freezer in which the food is carried directly on the carriers. Carriers enter the top of the freezer at position 93. With actuation of the traverse means, platform carriers move to positions shown in 18B. Carriers used in this freezer might be similar to the circulating tray 122 shown in FIG. 24.

All trays or tray carriers of this invention are best adapted to handle food or perforated food packages, which do not have surface water present on them, which could cause the food or food packages to freeze to the trays or tray carriers. In the case of cooked or partially cooked foods, such as french fried potatoes, and prepared specialties, no water is present and they may be advantageously handled in a tray type freezer.

In FIGS. 19A, 19B, 19C and 19D is shown a circulating carrier type freezer with multiple channels. Food trays are introduced to the carriers 1 at transfer position 98. In this embodiment they are transferred down through channel 101, up through channel 102, down through channel 103, up through channel 104 for return across transfer rack 97 to the original position 98 where a tray of frozen food is removed and a tray of unfrozen food is inserted. Traverse means is provided to move the trays from the top side of up channel 102 to the top side of down channel 103. It will be noted that there is a smaller number of carriers in channels 102 and 103 than in channels 101 and 104. The transfer of carriers in a multiple channel freezer is essentially the same as that described in the transfer of the carriers in the freezer of FIG. 1.

In FIG. 20 is shown schematically the refrigerant circulating system for the freezer of this invention. Liquid refrigerant is stored in tank or container 107 where it may be isolated with respect to ambient air by valve means in pipes 106, 110 and 115 that there may be complete removal of the refrigerant from the freezer body 2 in case it is desirable to clean or maintain the freezer portions. In operation valves is pipes 106, 110 and 115 are open and liquid refrigerant is pumped from storage container 107, through pipe 110 to purifying means such as a filter 108, and to pump 109 for circulation through pipe 112, pipe manifolds 113; thence to spray manifolds 58, 59 and 60 inside the freezer body 2. While liquid purifying means 108 is shown as a full flow device in pipes 110 and 111, it may inserted as a partial flow device with the main flow from pip 110 directly connected to pipe 111. Gaseous refrigerant is removed from the freezer body 2 through pipe 114, through condensing purifying means 116 for return to the storage container 107 through pipe 115. Excess quantities of sprayed liquid refrigerant return from freezer body 2 through pipe 116 to storage container 107.

In the foregoing descriptions wherever vertical stacking of trays is shown the side 4 of carrier 1 can be dimensioned to provide a space between the upper surface of the tray 47 and the bottom surface of the carrier 1 equal to the desired frozen height of food packages being processed. When the packages are placed in the trays and the carriers are stacked, during freezing, the weight of the superposed trays and carriers will apply forming pressure to the packages being frozen. With such dimensioning the top and bottom surfaces of the frozen packages will be formed flat and parallel to provide better stacking and packing characteristics.

In FIG. 21 is shown a horizontal configuration of a tray freezer. Trays are traversed horizontally through this freezer, being positioned properly for traverse in two directions by transfer racks 120 and 121, each adapted to be moved to two different vertical positions, as shown by the dotted and solid lines of FIG. 21. Trays enter the freezer in position 47f, occupy progressively positions 47g through 47t to discharge position 47v, where they may be removed from the freezer body 2. Transfer racks 120 and 121 may be positioned vertically by an appropriate means such as a hydraulic jack.

In FIGS. 22 and 23 there is shown a direct contact freezer in which circulating trays 122 carry the food through the freezer. These trays are traversed across the top of the freezer by a traverse means 45 and across the bottom of the freezer by a traverse means 38 of FIG. 22. Vertical positioning of the carriers is the same same as that described by the freezer of FIG. 1 and the retaining dogs for the carriers also are similar to that used in the freezer of FIG. 1. Food enters through a barometric duct 138 shown with vertical extension, but it may be an angular chute also having vertical extension through which the food enters. Sensing means 141, pressure means or analysis means differentiating between refrigerant gas and air are located at an intermediate vertical position on the barometric entrance duct to provide the sensing means for a compressor intake flow control; the compressor being associated with the gas liquifying and purifying means shown at 116, FIG. 20. Barometric channel 139, shown in FIG. 23, is another form of pressure control system for the freezer in which a sensing device 140 either pressure or analytical is inserted at an intermediate point such that a separation line between the dense refrigerant in the bottom of the barometric channel 139 and less dense air or mixture of air and refrigerant in the top portion of barometric column 139 is sensed and caused to control the inlet flow associated with gas reliquifying and purifying means 116 of FIG. 20. By these control means a pressure may be maintained in the freezer body 2 which is very close to ambient pressure at all times and the tendency for leakage of air into the freezer body 2, or refrigerant out of the freezer body 2, is minimized.

Lifting arm 143 carriers lifting dog 144. It is pivoted about a pivot point 157 by an appropriate rotating shaft means whereby the tray in position 122a may be rotated for discharge of its contents into chute 137. Dog 144 is similar to upside dog 24 of FIG. 2, and when the lifting arm 143 is in its downward position allows the tray 122, when pushed upwardly, to displace the dog which falls in place under the tray in position to engage the tray for rotation and discharge. Trays are traversed across the bottom and top of the freezer body by traverse means 38 and 45 shown in FIG. 22. A more detailed view of the trays is shown in FIGS. 24, 25 and 26 where it may be noted that the tray is constructed with a perforated bottom illustrated here by holes 123, FIG. 24, that there is space for spray for spray entry between carriers 122 as each carrier is supported on tray support element 124 below it. Stiffness for tray support elements 124 is provided by the backside 160 of tray 122 and stiffening bar 142 running across the forward or discharge side of the tray. Tray support element 124 may be provided with an antifriction surface material, which will aid in traversing the carriers from one side of the freezer to the other, and an antifriction slide 54 shown in FIG. 22 may be incorporated in the bottom of the freezer to assist in traversing the trays. In traversing across the top of the freezer the carriers slide on each other, support element 124 engaging tray bottom 125 in the space between channels, additional support is provided by a portion on the top of center guide 142. The tray 122, FIG. 25, is equipped with a door 127 adapted to be opened by door opening cam 132, a portion of the freezer body 2 when the tray is rotated to the discharge position. The door 127 is gravity closed rotating about bearing means 130. To prevent spillage as the tray is emptied into chute 137, the tray sides are narrowed at point 145, FIG. 24, to a position 146, which allows pivot discharge chute portion 129 to enter slots 126 in the tray bottom. Pivot discharge chute portion 128 carrying side portions 129, pivots about center 158 as trays 122 rise to the top of the up channel, clearing the top most tray thereof and falling by gravity or spring action into the downward dotted portion shown in FIG. 25 in which position the bottom of the moving chute portion 128 and its side portions 129 enclose the side portions 146 of tray 122, FIG. 24, thereby providing a spill proof chute from the tray to the discharge chute 137. As the tray 122 is pivoted, it rotates about a support formed by portion 147 of tray support element 122, the bottom of the tray 125 for vertical support and the discharge edge of the tray in cooperation with stationary guide portion 133 of the freezer body for horizontal support. This combination assures definite positioning of the tray as it is rotated into and from the discharge position.

OPERATION

The operation of this invention is as follows; carriers 1 in positions 9 to 23 circulate through the freezer body 2 as shown in FIG. 1. To provide circulation the carrier stacks are intermittently raised and lowered by lifting platform 3 shown in more detail in FIGS. 10, 11 and 12. The platform is adapted to fit between the supporting sides 4 of the carrier shown in some detail in FIGS. 5, 6 and 7. The lifting platform 3 is propelled upwards by the pistons 5 of hydraulic jacks 6. When the lifting platform is in its highest position, the bottom carriers in both channels of the freezer body 2 are lifted to a level 7 which lies above a downward level 7' as shown in FIG. 1; also shown in more detail in FIGS. 2 and 3. In this carrier position upside dogs are closed inwardly as shown in FIG. 2 by gravity or a spring which causes the dogs 24 to rotate about supporting pin 25. In the upward position of the lifting platform 3, the downside dogs 26, FIG. 3, are held open by the action of spring 27 forced upwardly by supporting platform extension 28 against the top element 29 of lifting pin 30, pulling bracket arm 32 through pin 31 to cause clockwise rotation of shaft 33 held in solid relationship with bracket arm 32; shaft 33 rotating in bearing block 34 is in solid relationship with downside dogs 26 which are held open as shown by the solid line portion of the dogs 26 in FIG. 3. The other upside dog 26 on the same side of the freezer is held open in a similar manner by the rotation of shaft 33. Upside dogs on the opposite side of the freezer, not shown, are equipped with a similar mechanism operating in the same fashion. When the lifting platform 3 is lowered, carrier in position 15, FIG. 1, comes to rest on dogs 24 in level 7' as shown in FIG. 2. The other dogs 24, supporting the carrier, are in the same position for the same reason, thus carrier in position 15 and all carriers above it are supported in a definite position determined by support dogs 24. On the downside of the freezer dogs 26 are held open by the action of spring 27 and its associated mechanism, allowing carrier in position 16 to drop through level 7. When lifting platform 3 has reached some lower level, carrier in position 16 being lowered with it, dog 26 is caused by gravity, or if necessary by a spring, to rotate into the dotted position shown by dogs 26 in FIG. 3. As the supporting platform is further lowered, carrier in position 16 comes to rest with supporting sides of the carrier 4 engaging the bottom of the freezer 35. The lifting platform 3 is further lowered out of engagement with the underside of carrier in position 16. All of the carriers above carrier in position 17 are lowered with carrier in position 17 until carrier in position 18 engages the now closed dogs 26 which support carrier in position 17 in level 7' as shown in FIG. 1, all carriers above it being in definite relationship with respect to this position. Carrier in position 17 located in position 7' is well clear of carrier in position 16 below it in contact with the bottom of freezer 35. As previously described, carrier in position 15 is also supported at level 7' well above carrier in position 16. Carrier in position 16 is pushed from the downside, arrow 36, of the freezer to the upside, arrow 37, of the freezer along a traverse way 42' including a gap formed between the bottom end of the guide 42 and the freezer bottom 35. In this position the carrier is shown by dot and dash line. The transfer means for carrier in position 16 may be provided by push rod 38 which moves from the solid position shown in FIG. 1 to the dotted position shown in FIG. 1, or by any other appropriate mechanism. After carrier in position 16 has been positioned on the upside of the freezer, hydraulic jacks 6 are again actuated raising the carrier through level 7', in which process it engages the upside dogs 24, thrusting them out of engagement position, carrier in position 16 going to level 7 at which point the dogs return to the supporting position shown by the solid line in FIG. 2. Downside dogs 26 remain in supporting position as the lifting platform 3 raises supporting platform extension 28, compressing spring 27 against upper element 29 of rod 30 without moving rod 30 until carrier in position 17 has been lifted clear of upside dogs 26, spring 27 in compression moves dogs 26 to the solid outlined position shown in FIG. 3 where they remain until carrier in position 17, together with lifting platform 3, has been lowered removing the compression from spring 27, allowing dogs 26 to return to the dotted position shown in FIG. 3 above carrier in position 17, thus allowing the carrier to be lowered to the bottom of the freezer and carrier from position 18 to be engaged by the dogs 26 when it has reached carrier level 7'. Concurrently, carrier from position 16, having been lifted to level 7 on the upside of the freezer, is engaged by upside dogs 24 as it is lowered by support platform 3 and is retained at carrier level 8 providing an open space below it into which carrier from position 17 may not be pushed by transfer means 38 which is afterward withdrawn to the solid position.

Again referring to FIG. 1 in the upward portion of the freezer, when carrier 1 supported by carrier in position 9 and other carriers below it, is in level 40, lifting platform 3 has lifted carriers in position 15 and 16 to level 7, just prior to the lowering of carrier to the freezer floor. At this time there is no carrier on the downside of the freezer at the same level as carrier 1 at the upside of the freezer and carrier 1 is traversed by push rod 45 from the upside of the freezer where it is shown in dotted lines along a traverse way 61' including a gap above the guide 42. At this level the bottom side of the upper deck of carrier 1 clears guide 42 and the side portions of the carrier 4, FIG. 7, may pass through slots 44 cut in guide 42 as shown in FIG. 16. During the traverse the tray 47, FIG. 8 is positioned on carrier 1, FIG. 5, by guides 70, FIG. 15, so that it will be clear of the carrier supporting sides 4 of carrier 1, FIG. 7, when in sequence the next carrier is traversed into position above it. When this operation has been completed, lifting platform 3 is lowered to the bottom of the freezer. Carrier 1 then drops to level 39 on the downside of the freezer and into guide 41 at the end 42 at the center and 43 at the sides. The position occupied by carrier 1 on the upside is now vacant and ready to be filled by the carrier in position 9 when carrier from position 15 is lifted in sequence to level 7 on the upside of the freezer at the bottom. By continuation of this action the carriers 1, positions 9 through 23, FIG. 1 are continuously circulated around the freezer at a rate determined by the operation of jacks 6 in cooperation with traverse positioning of devices 38 and 45.

FIG. 5 is a plan view of a carrier which along with FIGS. 6 and 7 illustrate the open construction of the carrier. The carrier is adapted to support perforated trays 47 which carry the food to be frozen through the freezer. Perforations 48 are provided to allow excess refrigerant to pass through the trays and onto the food supported on the next lower tray. Lip portion 49 is provided to retain food portions on the tray and to provide a pushing surface which is engaged by traverse means 72, FIG. 13, in handling the trays into and out of the freezer body. Carrier 1 of FIG. 5 is constructed of bars 50 and peripheral members 51; the whole being supported by sides 4. The open construction of the deck of the carrier is to provide for the passage of liquid refrigerant downwards through successive trays and carriers. Guide means 52, shown in FIG. 5, are to provide retention of trays 47 as they move from the upside to the downside compartments of the freezer. The carrier supported sides 4, FIG. 6, are provided with openings 53 to provide spray access into the various trays as they are stacked in the freezer compartments. Carrier support sides 4 may be faced with a low friction medium 54 adapted to engage the upper portions of the carrier support members 4 and 50 and the bottom portion of the freezer 35 or, if desired, a bottom runner portion 55 may be provided with other antifriction means. These are replaceable antifriction means provided for easier movement of the trays from one side of the freezer to the other and for maintenance of the dimensions of carrier supporting sides 4 in case of wear.

Jack piston rods 5, FIGS. 10, 11 and 12, cycle the lifting platform between two positive positions at a timed or controlled rate; one at the top of the jack stroke and a second at the bottom of the jack stroke; thus a minimum of hydraulic and operational control is required to circulate the carriers around the freezer circuit. Closed structure is used throughout on this platform as indicated by channel 56 with a covering portion 57 illustrated in FIG. 12. In this manner food retention is minimized and clean up procedures are simplified. The two hydraulic jack actuating piston 5 are preferably operated in synchronism in order that the platform may be maintained during operation in a level position and thus the carriers 1 supported by the platform 3 will also be maintained in a level position.

The controls necessary for the timed actuation of the various actuating mechanisms of this device are shown schematically in FIG. 27 wherein a suitable hydraulic pump 162, suitably powered by an electric motor not shown and controlled by a electrical connections in a manner well known, is connected to a supply tank 161 by pipe means communicating with its suction side. The pressure side of the pup 162 is suitably connected by pipe means to a bank of four individually actuatable valve sections 163, 164, 165 and 166, respectively, all of which valves are suitably electrically connected to a multiple cam timer 167 wherein the cam 168 actuates a solenoid associated with valve 163 and the cam 169 is similarly associated with valve 164, cam 170 is similarly associated with valve 165, and cam 171 with valve 166. The timer cam 172 is similarly electrically connected to a solenoid controlled valve 175 which is suitably supplied with a pressurized stream of liquid refrigerant and controls the flow of this liquid refrigerant through pipe means connected to the spray manifolds such as manifold 60 with the desired timing of the spray to avoid spraying more liquid on the food about to be removed from the freezer.

As seen in FIG. 27 the valve section 163 is connected to the head end and rod end of a cylinder controlling push rod 38 by pipe means 178 and 179, respectively, and is operated by the timer section 168 through the electrical connection 176 as follows: when the electrical connection 176 is not energized valve section 163 will connect the pump 162 with the rod end feed line 179 to maintain the cylinder 38 in the collapsed position with the push rod 38 at the maximum withdrawal position. Upon energization of the electrical connection 176 by the timer section 168, solenoid actuation of the valve section 163 will reverse the connection so that the pump 162 is connected by line 178 to the head end of the cylinder controlling push rod 38 while the line 179 is connected by valve section 163 to the exhaust line 177 which in turn connects directly to the tank 161 so that with the electrical connection 176 energizing the solenoid of section 163 pressurized fluid through 178 will be available to extend the push rod 38 to its maximum extension and the hydraulic liquid in the cylinder rod end will be exhausted through line 179, valve section 163 and exhaust line 177, back to the tank 161 in a manner well known to all familiar with the art of hydraulic actuation. In an entirely similar manner timer cam 169 energizing the solenoid of valve section 164 will cause extension of the rod end of push mechanism 45 and interruption of such energization will result in pressurizing the rod end of the push mechanism 45 with consequent retraction of that push mechanism. Similarly a cylinder 72' controlling the action of push rods 72 is connected to valve section 165 controlled by timer section 170 to similarly connect the pump 162 to one end of the cylinder 72' while connecting the exhaust line 177 to the other end of the cylinder 72' and to reverse connection depending on the energization and non-energization of the solenoid associated with valve section 165.

The valve section 166 through a pipe means 174' connecting valve section 166 to a flow divider 174 connected to the rod end of the two cylinders 6 acts in a manner to insure equal amount of hydraulic liquid passing through the flow divider 174 to both of the rod ends of the cylinders 6 simultaneously. In like manner a pipe means 173' connects a flow divider 173 so that fluid from the valve section 166 through the flow divider 173 is supplied in equal amounts to both head ends of the cylinders 6. When, by action of the timer cam 171, the solenoid of the valve section 166 is energized pressurized fluid is supplied to the rod ends of cylinder 6 from the pump 162 through the valve section 166 the pipe means 174' the flow divider 174 and the pipe means connecting 174 to the rod ends of the cylinders 6 while at the same time the head ends of the cylinder 6 are both connected to the flow divider 173 and pipe means 173', through the section 166 and the exhaust pipe means 177 back to the tank 161. Thus, when the timer section 171 is not energizing the solenoid of valve section 166 the rod portions 5 of the cylinder 6 will be completely retracted and the lifting platform 3 will be in its lowermost position as earlier described.

It is of course to be realized that the electrical, hydraulic and liquid refrigerant sections described above as shown in FIG. 27 are highly simplified schematic representations containing the necessary basic ingredients but susceptible of as many refinements and added features as desired in actual building of the apparatus of this invention. Synchronization of hydraulic jacks 6, FIG. 1, is preferably accomplished by flowing the hydraulic fluid for each of the two jacks through a pair of flow dividers 173 and 174 such as positive displacement hydraulic motors, the shafts of which are mechanically coupled or the like. Such an arrangement given equal sized motors provides equal division of the hydraulic fluid to the jacks and they maintain synchronization both on the up stroke and the down stroke.

As shown in FIGS. 15 and 17 guides 41, 42 and 43 are provided within the up and down compartments of the freezer to hold the carriers and trays in an aligned position as they move into, out of, up and down through the freezer. Guides 41, 42 and 43 also space the carriers and trays from the freezer walls 58 of the freezer body 2. This provides space for the location of side spray manifolds 59 and top spray manifolds 60 in such a manner that the sprays emitting therefrom may be directed to give complete coverage of the food pieces being carried on trays 47 as they move through the freezer. If food is to be frozen in a minimum time, it must be continually in contact with the boiling liquid refrigerant. This contact must be maintained uniformly otherwise the food pieces will not be frozen uniformly. This necessitates the placement of the spray heads and freezer walls 58 at least a modest distance from the carriers as they travel through the freezer.

In the interest of refrigerant conservation, it is important that, after freezing and bringing the food to some temperature of 0° or above, the application of refrigerant be discontinued in order that the residual heat in the interior of the food portions when equalized with the lower exterior temperature will evaporate any remaining refrigerant. Using R-12 as a refrigerant and maintaining the pressure inside the freezer at 1 atmosphere provides a refrigerant boiling point of −21° F.; thus if the application of refrigerant is stopped at the proper time in the time cycle, the retained heat in the food will be sufficient to evaporate residual refrigerant after the application of the refrigerant is discontinued. When the cycle is properly timed, the equalization of the food temperature will bring the food to the desired exit temperature, frequently about 0° F. as shown in FIG. 1 spray manifolds 59 are discontinued for a distance before the carriers and trays reach the top of the freezer in the upward moving channel to provide for temperature equalization before tray removal.

There is provided a door 61 between the top portion of the upward moving channel and the top portion of the downward moving channel of the freezer as shown in FIG. 17. This door prevents spray emitted by top manifolds 60 from reaching the food on the trays and carriers in the upward moving channel of the freezer. It is advantageous to stop the refrigerant flow to manifolds 60 at the time a carrier loaded with a tray of unfrozen food is transferred from its initial position in the upcast channel of the freezer to the top position in the downcast channel of the freezer. This prevents spray from these manifolds or splatter passing through to the upcast freezer channel during carrier transfer. As shown in FIG. 17 door 61 pivots on a hinge 63 and is no wider than the space between carrier support sides 4. When the carrier is moved from the up channel of the freezer to the down channel of the freezer, the door is pushed open by members 51 of the carrier and lies in approximately a horizontal position as shown by dotted lines in FIG. 17 until the carrier has been completely transferred to the down channel at which time a spring member, not shown, returns the door 61 to a vertical position against door stop 62. The supporting sides of the carrier pass through slots 44 in center guide member 42; thus allowing the carrier to pass from one side of the freezer to the other with minimum openings between the compartments. It is desirable that door 61 be located eccentrically with respect to the separating portion 42 in order to provide space for it to fold down and re-erect itself between carrier positions. It is also necessary that up and down carrier channels be established with enough space between carriers that the door 61 has sufficient height for the food carried on top of the trays to pass from compartment to compartment without striking door stop 62.

Referring to FIG. 13, which is a view of the freezer with the top removed, it may be seen that the food trays 47a move through incoming air lock 74 on a conveyor means 73 into air lock portion 75, then travel at right angles into the top position of the upcast side of the freezer, pushing out of the upcase side of the freezer a tray 47d into exit air lock 76, the successive positions of a tray in this sequence are 47a, 47b, 47c through the freezer back to 47c and 47d. With trays occupying all of the aforesaid positions, traverse mechanism 72 is energized pushing tray 47b into contact with tray 47c containing frozen food at the top of the freezer as tray 47b moves to the position of 47c, it ejects the tray in that position into contact with conveyor mechanism 77, which moves the tray to position 47d and eventually onto conveyor 78 for delivery to packaging or storage areas. When this transfer of positions has been made, traverse mechanism 45 is actuated moving the carrier along with the tray of unfrozen food from position 47c to position 47e where is starts its downward travel through the freezer. Traverse mechanism 45 is then withdrawn, lifting platform 3, FIG. 1, is raised and another carrier is raised to the up position in the freezer at 47c, FIG. 13. When the lifting platform 3, FIG. 1, is lowered, the carrier at position 47e is lowered making room for the transfer of another carrier with unfrozen food from position 47c to position 47e.

At the completion of cycling of trays from positions 47b, 47c to 47d, the position 47b being open receives an entering carrier from position 47a. Combination guide and back stop 69 desirably might contain a limit switch means actuating conveyor 73, at the time when tray in position 47b has been relocated to position 47c, to transfer tray 47a to position 47b. The same or another limit switch associated with back stop 69 would stop conveyor 73 when it has delivered the tray from position 47a to position 47b. An alternate arrangement is for the trays to move down conveyor 73 by gravity, continuing on into position 47b from position 47a when the tray in position 47b has been delivered to position 47c. The tray at position 47a would then move on into position 47b when traverse means 72 was retracted from an interferring position. As the tray from position 47c is pushed out of the top of the freezer, it reaches conveyor 77 a short distance after it beings to exit. Conveyor 77 is moving in a direction to transfer the tray from position 47c to position 47d and when more than 50 percent of the weight of the tray rests on the conveyor, the tray will be carried to position 47d and transferred to conveyor 78 FIG. 13 independent of transfer mechanism 72. The trays are guided for positioning to insure easy travel, by guide portions 99, 100, 69, 70 and 71. As the trays travel into the various positions required to load the trays carrying unfrozen food into the freezer and to remove the trays carrying frozen food from the freezer, they pass through air locks 74, 75 and 76, FIG. 14, containing spring and gravity actuated sealing doors 82, 83, 84 and 85. These doors are actuated by the trays as they travel through the air locks returning to a closed position automatically after passage of the tray. This arrangement insures that at least one door will be closed in each air lock at all times; thus sealing the refrigerant gas in the freezer. There will be some spill out of gas through door 82 at the time a tray enters air lock portion 75 from air lock portion 74. The refrigerant gas being heavy will tend to flow out of the entrance to the air lock where it is captured by refrigerant vapor hood 79 and withdrawn through outlet duct 80 to a purifying means since it will be at least partially contaminated with air. In a like manner, a hood and duct, not shown, may be positioned at the exit of the air lock portion 76 or in either case an exist duct 81 may be placed between the air lock doors 84 and 85 as shown for exit air lock 76, and between the doors 82 and 83 as shown for entrance air lock 75. Gases from these air lock portions may be withdrawn through duct 81 after air lock doors 84 are closed in the case of air lock 76 or air lock door 83 is closed in the case of air lock 75.

While the freeze time normally required for most sizes of food portions would normally be satisfactory in a two channel freezer; one downcast and one upcast side, where longer hold times in the freezer are required, a multi-channel freezer may be desirable in the case where chicken, turkey and large packages are to be frozen. Such an arrangement is depicted in FIG. 18 which incorporates a schematic view FIG. 18A of the top portion of a freezer 86, and a corresponding view FIG. 18B of the top portion of the freezer 86 after one step in the cycle.

In FIGS. 18A and 18B the lifting platform has been elevated to its maximum height and carriers 1 are in the position shown. Channel 101 has a vacant area at the top as does channel 103 and channel 102 and 104 have carriers located one carrier height higher than those in 101 and 103. In this configuration the food to be frozen is carried on the carrier without a tray. In this position incoming carrier 93 is introduced into the top of channel 101 simultaneously traverse means moves carrier 105 to channel 103 and carrier 94 out of the freezer. At the finish of this operation, the configuration at the top of the freezer is as shown in FIG. 18B. This arrangement depicts a four channel freezer but by the same process, the freezer may be extended to any size.

FIGS. 19A, B, C and D depict a multichannel arrangement wherein the carriers are circulated continuously through a freezer body having an even number of channels greater than two, unfrozen food being introduced into the freezer and frozen food being removed from the freezer on trays in position 98. A return transfer track 97 is incorporated across the top channels 102 and 103. One or more extra carrier is placed in channels 101 and 104 than in 102 and 103. In the up position of the lifting platform shown in FIG. 19A, the top carriers 1 are traversed one channel to the right across the track for each vertical cycle of the lifting platform. The lower carrier in channel 102 at the same time is traversed one position to the left to dotted position shown in channel 103 (FIG. 19B). In the down position, shown in FIG. 19C, the bottom carriers in channels 101 and 103 are lowered to the floor of the freezer and traversed to the left one channel (FIG.19D). In this manner the carriers may be circulated continuously around a multichannel freezer having an even number of channels.

A further embodiment of this invention is illustrated in schematic drawing, FIG. 21, which is a horizontal version of a direct contact freezer. Trays 47 are introduced to the main body of the freezer by means which may be located in the 47f position, resting on the top level of transfer rack 120 in the racks downward position, transfer rack 121 is in the up position and has no tray on it at this time. After the tray in position 47f has been introduced, it is traversed in the direction of the arrow until it occupies position 47g, tray in position 47h having been transferred to the top of transfer rack 121. Simultaneously, trays in position 47m on the lower portion of transfer rack 120, along with trays in position 47n and 47p are traversed one rack width to the left so that the tray in 47p comes to rest in position 47q on transfer rack 121. Transfer rack 121 is lowered to the dotted position shown and transfer rack 120 is raised to the dotted position shown. In this position the tray on the top level of rack 121 and the tray on the bottom level of rack 121 are traversed one position to the right, so that these trays then occupy position 47v and 47s respectively. The tray in position 47k is transferred to the bottom portion of transfer rack 120 and the tray in position 47t is transferred to position 47v for removal from the freezer. After removal of the tray in position 47v, transfer rack 120 is lowered to its bottom position and transfer rack 121 is raised to its top position and the cycle is repeated. By this method trays are traversed across the traverse tracks 117, 118, 119 and the bottom of the freezer 35 providing an adequate retained time in the freezer for the food carried on the trays 47.

It is to be appreciated that the foregoing description can be as readily applied to suitably dimensioned food packages and groups of packages as to the trays of that description.

Evaporated liquid refrigerant returns from freezer body 2, as shown in FIG. 20, through a pipe 106 to storage tank 107 from which it passes through pipe 110 to liquid purifying means 108 where dissolved, unwanted impurities are removed as well as solid impurities such as ice crystals. The purified liquid refrigerant flows through pipe 111 to pump 109 where its pressure is raised to the desired level. From pump 109 the refrigerant passes through pipe 112 to distribution manifolds 113 connected to spray side manifolds 59 and top spray manifolds 60 which distribute the liquid refrigerant in relatively finely divided spray onto or in proximity to the food carrier on carriers 1 which are being circulated through the freezer. Evaporated gas refrigerant, ice crystals and refrigerant hydrate are removed from the freezer body through pipe 114, pass to gas reliquefying and purifying means 116, from which it is returned through pipe 115 to the storage tank 107.

Another embodiment of the direct contact freezing principle is shown in schematic FIGS. 22 and 23. In the freezers illustrated in these figures, circulating self-supporting trays are used instead of tray carriers with trays. FIGS. 24, 25 and 26 comprise top views and two sectional side views of such a tray, respectively. It will be noted that the tray support element 124 in this configuration lies above the bottom of the tray and supports the tray above it thereon as shown in FIG. 25. The support element 124 or the bottom portion of the tray may be provided with antifriction material which will reduce the difficulty of sliding. The bottom of the tray is perforated with openings 123 FIG. 24 in order that sprayed liquid refrigerant may pass through consecutive trays to provide refrigerant to the food throughout the body of the freezer. Space is also left above the tray sides and below the bottom of the next adjacent higher tray for the introduction of sprayed refrigerant to the food carried on the tray from all sides. The sides of the trays 122 are attached to the support members 124 to provide extra stiffness both to the tray and to the support member. Additionally, there is a support member 142 running from one side of the tray to the other. The support member is placed near the discharge side of the tray as adequate support near the back of the tray is furnished by the back side member of the tray. These trays are circulated through the freezer in the same manner previously described in connection with freezer of FIG. 1. The stacks of trays being alternately raised and lowered by lifting beams, the bottom up channel trays being retained by gravity or spring closed dogs after being raised to a maximum level by the lifting mechanism. The bottom downside trays being progressively released by spring actuated dogs as the lifting mechanism is lowered, the second downside tray from the bottom being retained on the spring actuated dogs so that the bottom tray shown in position 122c, FIG. 23, may be freely traversed across the bottom of the freezer to a position such as 122b, FIG. 22. An antifriction sliding element 54 may be attached to the bottom to provide a lower coefficient of friction as the trays are traversed across the bottom.

As shown in FIG. 23, when upside carrier in position 122a has reached the top, it may be rotated as shown by lifting arm 143, carrying dog 144, which is similar to the dog shown at 24, FIG. 2. The dog 144 having moved out of the way as carrier 122a came into position, trips under carrier 122a, when it reached its uppermost position, so that it may engage the bottom of carrier 122a which may be pivoted into an unloading position as shown in FIG. 23 by the lifting arm 143; thus discharging its contents into chute 137 for removal from the freezer.

More detail in connection with this discharging process is supplied in FIGS. 24, 25 and 26. It will be noted that the carrier body is reduced in width at points 145 and that a tray door 127 is attached to tray side portions 146 by pivot pins 130. The front portion of the tray door effectively closes the open side of the tray and it remains closed in all normal positions since the force of gravity is acting to keep the door in a downward position in contact with the tray bottom 125. A pivoting chute portion 128 is associated with and inside of the freezer discharge chute 137. As tray in position 122a is brought to its top position, pivot chute portion 128 moves out of the way as shown by the upper dotted outline in FIG. 25. When the tray has reached its uppermost position, indicated by line 134, FIG. 25, pivoted chute portion 128 drops back to the position of the solid outline shown in FIG. 25. When the bottom lifting platform is lowered allowing the upside trays to rest on the upside dogs 24, the bottom of the tray in the 122a position drops to level 135 as shown in FIG. 25, and the pivoting chute portion 128 returns to the lower dotted position shown in FIG. 25; thus lying under the discharge lip of tray bottom 125. Lifting arms 143 are now actuated rotating the tray in 122a position about a traveling pivoting position established by tray support element portion 147 and the tray bottom 125, the position of lifting dogs 144 along the tray is chosen to provide position action, with a minimum of force between the tray bottom and the tray support portion 147. As the tray in position 122a is rotated, it is retained in a horizontal direction by rigid elements 133, associated with the freezer wall structure bearing against portion 148 of the tray bottom. The cooperation of the stationary support portion 133 in contact with the tray bottom portion 148 as well as support portion 147, allows the rear portion of the tray to move through a definite, nearly circular orbit, into an unloading position as shown in FIG. 23. While in this position, discharge of the contents of the tray are assured without spillage by the pivoted chute portion 128 and its sides 129 which move into slot portions 126 in the tray bottom outside of tray side portions 146. In a final part of the orbital movement of the tray, door 127 is opened when its top portion comes in contact with door opening cam 132. At this time the tray may empty its contents into chute 127 with no likelihood that food will be spilled into the freezer body. At the completion of this unloading cycle, lifting arm 143 is lowered, tray 122a returns to a horizontal position as shown in FIG. 22, lifting dogs 144 are lowered from contact with the bottom of the tray and traverse mechanism 45 may be actuated to traverse the tray from position 122a to position 122d as shown in FIG. 3. When tray in position 122a was lowered to a horizontal position, the tray door 127 closed by gravity. In case of any minor interference with the door; however, an extension 136, FIG. 22, is provided on the actuator mechanism to insure complete closure of the tray door 127.

After the tray has been traversed into position 122d, it may be refilled with unfrozen food through barometric column 138. The bottom of this column may be adjustably located as near the top as the tray in position 122d as desired, which position would depend on the nature of the food being introduced. The food portions may be lowered through barometric column 138 by gravity as in falling or the barometric column 138 may be sloped to provide for minimal danage to the food during introduction at the same time maintaining a rise above the freezer top sufficient to provide a barometric column for the vaporized refrigerant contained in the main body of the freezer.

Refrigerant R-12, the preferable refrigerant in a direct contact food freezer, has a density of 0.41 pounds per cubic feet at —20°F. and 1 atmosphere, the pressure at which a food freezer would be expected to operate. Standard atmospheric air at this pressure has a density of 0.75 pounds per cubic foot so that the refrigerant is more than 5 times as heavy as the surrounding air. This will result in an air refrigerant stratification in the barometric column 138, FIG. 23, shown as a combination food channel and barometric column 139, FIG. 23, where it is shown as a barometric column intended for pressure control only. Accurate control of the pressure inside the refrigerator may be maintained by placing a sensor at some position such as 141, FIGS. 22 and 23, or 140, FIG. 23. This sensor might be either a pressure actuated sensor measuring the difference in pressure as a stratified layer of refrigerant rises or falls in the barometric column, or it may be a sensor such as an infrared, or other analyzer which would measure the actual refrigerant concentration with respect to air at the sensing point. Information provided by such a sensor is then used to accurately control the intake flow volume returned to the gas liquefying and purifying means 116, FIG. 20, through pipe 114. Accurate control of this volume by sensor controlled flow actuating means will maintain ambient pressure in the main freezer body 2, FIG. 23, such that there will be minimal leakage through openings in the freezer and minimal pressure on a sealed container which might be connected to the discharge chute 137.

Careful sealing of a direct contact freezer is important since the usual refrigerant R-12 Diflouro-Dichloro-Methane is an expensive refrigerant selling at this time at 30 cents a pound. The density of the gas at — 20° is approximately four tenths of a pound per cubic foot so that each cubic foot of gas is worth 12 cents. It is important that there be a minimum loss of refrigerant gas from the freezer and that the freezer volume be held at a minimum in order that the loss of gas refrigerant when the freezer is cleaned or serviced may be minimized. This operation is likely to occur once each day or once each few days. The value of the refrigerant gas in a freezer having internal dimensions of 4 feet wide, 4 feet high and 40 feet long is $74.60. FIG. 1, FIGS. 19A through 19D and FIGS. 22 and 23 show that space in the refrigerator of this invention has been carefully conserved. It can be determined from these drawings that the ratio of product carrying space on the carriers is considerably more than 30 percent of the freezer volume, thus a maximum amount of frozen product may be produced with a minimum total freezer volume.

In ordinary cryogenic freezers such as those using liquid air, liquid nitrogen or carbon dioxide there is no equivalent significance. These products are either inexpensive in terms of their cost per cubic foot in comparison to R-12 or other flouro carbon refrigerants such is the case with nitrogen and air or are wasted to the atmosphere as is usually the case with air, nitrogen or carbon dioxide. As shown in the drawings FIG. 1, FIG. 19A through 19D and FIGS. 22 and 23 the main motion and time of residence in the freezer of this invention is in vertical channels which are contiguous to each other or to a condensing means. This is for the purpose of maximizing the ratio of product in process as compared to total contained refrigerator volume.

The vapor of R-12 is quite heavy as compared to air and it is thus desirable that the main body of vapor lie below entrances, exits and sealing means to minimize the loss of vapor from the freezer. In practising this invention it is desirable as shown to introduce to product at the top of the freezer, the product traveling first vertically downward through the freezer body and along subsequent paths which are substantially vertical, the last path before removal of the product from the freezer being vertical upward. This provides a maximum ratio of product being processed as compared to freezer volume.

The evaporated refrigerant gas maybe condensed within the freezer compartment main body as compared to condensation in an extension of the main body. The separators 42 shown in FIG. 1 and FIG. 23 may conveniently be condensing apparatus in which case they serve the multiple function of separator and condensor. Separation between channels as before mentioned is necessary to protect the exiting frozen product from contact with liquid refrigerant thus allowing evaporation of residual refrigerant from product surface before the product exits from the freezer. Tests subsequent to the filing application Ser. No. 743,356 have further indicated the importance of this evaporating time following a last contact with liquid refrigerant, in the case of frozen breaded french fried chicken for instance, a period of at least 5 and sometimes as much as 10 minutes is required after the food is removed from contact with liquid refrigerant prior to discharging the product from the refrigerator body if all of the liquid refrigerant is to be evaporated and the loss of refrigerant outside the freezer is to be minimized. An equal or longer time is required for other porous products, such as bakery products. Another means of conserving this trapped refrigerant is to deliver the product into a sealed container through the connecting discharge chute 137 as described in the original application, Ser. No. 743,356, and my co-pending application Ser. No. 743,676

While application Ser. No. 743,356 discussed for the most part freezer in which the liquid refrigerant was sprayed on the product as it was being frozen, it was also pointed out that the application covered a means of "freezing relatively large portions of food in direct contact with a boiling refrigerant," generally. In certain cases, as for instance when freezing breaded french fried chicken in R-12 a variation in freezing rate as the process progressess is desirable. When the chicken is first introduced, less than the maximum possible freezing rate is advantageous for a period of 4 to 5 minutes while an initial crust is frozen around the chicken parts. If this is not done, cracking of the final frozen product occurs in certain instances. When freezing this product, a desirable arrangement is to spray the product for a first portion of the freezing cycle immersing the product in liquid refrigerant, line 200 FIG. 23, to achieve a maximum freezing rate for a second portion of time and subsequent to this portion of the cycle removing the product from contact with liquid refrigerant and providing time for the adhering and absorbed liquid refrigerant to be evaporated by heat contained in the product above a usual terminal product temperature of 0° F. During the immersion period in such a cycle the freezing rate is reduced as compared to that possible at the beginning of the cycle if the product were initially immersed because the surface temperature of the product has been lowered from the entrance temperature of as much as 250° F. to approximately −20° F. and also due to the fact that a frozen shell exists between the surface of refrigerant contact with the product and the unfrozen interior surface where the latent heat of solidification is being extracted from the product, the intervening distance is in a frozen material in which the heat conduction rate is reduced. By using this process maximum freezing time may be achieved with minimum damage to the product being frozen.

The described apparatus and operation is a preferred embodiment of this invention, but it is contemplated that various other arrangements of air locks, air seals, lifting arrangements, supporting dogs, and refrigerant recovering means may be used within the scope of this invention.

What is claimed is:

1. A direct contact freezer comprising: an insulated housing having a continuous elongated product conveying passageway therein; said passageway consisting primarily of a plurality of adjacent substantially vertical channels with the product being frozen primarily during the conveying thereof through said channels and being discharged from said housing adjacent the upper end of the last of said channels; perforate product carrier means for carrying through said housing the product to be frozen; means for conveying a sequential plurality of said carrier means downward through the first said channels and upward through said last channel; means to dispense liquid refrigerant in said housing to contact the product as the product is being conveyed by said carrier means through a vertical portion of said passageway; and said vertical portion of said passageway being located with respect to the discharge of the product from said housing to permit substantially complete vaporization of any refrigerant contacting the product prior to the discharge of the product from the freezer.

2. The apparatus of claim 1 wherein said liquid refrigerant has a boiling point thereof at one atmosphere of no less than −50° F.

3. The apparatus of claim 1 wherein said conveying a sequential plurality of said carrier means is in discrete steps.

4. The apparatus of claim 1 wherein said means to dispense liquid refrigerant includes spray means to disperse liquid refrigerant onto the product as it is being conveyed through said at least a portion of said passageway with said spray means being located with respect to the discharge of said housing to permit substantially complete vaporization of any refrigerant dispersed on the product by said means prior to the discharge of the product from the freezer.

5. The apparatus as specified in claim 1 wherein each of said carrier means includes a perforate tray introduced into said housing through an entrance portion thereof.

6. The apparatus as specified in claim 4 wherein said spray means include refrigerant dispensing nozzles and some of said nozzles being located to discharge transversely of at least one of said channels and other of said nozzles being located adjacent the upper end of at least one of said channels other than said last channel to discharge downwardly into said at least one of said channels.

7. The apparatus of claim 1 additionally including tray feeding means which sequentially introduces one of said trays into said housing while simultaneously discharging another of said trays therefrom.

8. The apparatus of claim 1 additionally including partition means intermediate at least two of said channels for at least a portion of the extent of said channels.

9. The apparatus of claim 1 wherein the product carrying volume of said carrier means times the number of carriers in said housing is equal to at least 30% of the internal volume of said housing.

10. The apparatus of claim 1 additionally including refrigerant condensing means intermediate at least two of said channels.

11. The apparatus of claim 5 additionally including feed conveyor means for moving successive ones of said trays into a first chamber; traverse means to transfer said ones of said trays from said first channel into said housing simultaneously discharging another of said trays from said housing into a second chamber; discharge conveyor means for receiving said discharged trays seriatim upon entry into said second chamber and additionally comprising: a first gas sealing means to control gas flow into and out of said first chamber; a second gas sealing means to control passage of gas between said first chamber and said housing; a third sealing means to control passage of gas between said housing and said second chamber; and a fourth sealing means to control gas flow between the atmosphere and said second chamber.

12. The apparatus of claim 11 additionally including exhaust means in gas communicating relationship with said fourth sealing means.

13. The apparatus described in claim 1 additionally including refrigerant removal duct is attached to at least one of said chambers.

14. The apparatus described in claim 5 in which said trays are discharged from said housing to an elongated duct for evaporation of retained refrigerant.

15. The apparatus of claim 1 in which a refrigerant concentration sensing means is located in a duct communicating with the interior of said housing at one end of said duct and with the surrounding atmosphere at the opposite end; said duct extending above the housing; and said sensor being located not lower than the highest portion of the housing.

16. The apparatus of claim 1 in which said carrier means are adapted for vertical rotation at the discharge point from said housing; and additionally including a discharge duct having a chute means adapted to cooperate in sealing relationship with said carrier means for the discharge product therethrough.

17. The apparatus in claim 1 additionally including condensing means within said housing and the product carrying volume of said carrier means times the number of carriers in said housing is equal to at least 30 percent of the internal volume of said housing exclusive of the space occupied by said condensing means.

18. The apparatus of Claim 1 in which at least two vertical channels are substantially contiguous; said vertical channels being partitioned from each other a portion of their length.

19. The apparatus of Claim 1, in which all vertical channels are contiguous except two separated by refrigerant condensing means.

20. A method of product freezing comprising the steps of: sequentially conveying successive portions of freezable product through a continuous elongated insulated path having entrance and exit portions and consisting primarily of a plurality of adjacent substantially vertical channels, the product being conveyed downwardly in the first of said channels and upwardly in the last of said channels; contacting the product with liquid refrigerant only as the product is being conveyed through a vertical portion of said insulated path; vaporizing substantially all of the liquid refrigerant contacting the product prior to the discharge of the product from said insulated path; and substantially simultaneously with said vaporizing, withdrawing the vaporized refrigerant from said insulated path.

21. The method of product freezing as specified in claim 20 including the additional step of regulating said refrigerant such that at least a portion thereof is vaporized by absorbing heat from the product during at least an initial portion of said conveying.

22. The method of product freezing as specified in claim 20 wherein said contacting the product is by spraying liquid refrigerant onto the product as it is being conveyed through said at least a portion of said insulated path.

23. The method of product freezing as specified in claim 22 wherein said spraying is of a liquid refrigerant having a boiling point thereof at one atmosphere of no less than $-50°$ F.

24. The method of product freezing as specified in claim 20 including the additional steps of: transferring the product to be frozen into said insulated path through sealed entry means and discharging the frozen product from said insulated path and into a sealed storage zone.

* * * * *